United States Patent
Ma (10) Patent No.: US 12,096,151 B2
(45) Date of Patent: Sep. 17, 2024

(54) METHOD AND APPARATUS FOR GENERATING VECTOR DIAGRAM AND STORAGE MEDIUM

(71) Applicant: BOE Technology Group Co., Ltd., Beijing (CN)

(72) Inventor: Xitong Ma, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/781,175

(22) PCT Filed: May 26, 2021

(86) PCT No.: PCT/CN2021/096040
§ 371 (c)(1),
(2) Date: May 31, 2022

(87) PCT Pub. No.: WO2021/238979
PCT Pub. Date: Dec. 2, 2021

(65) Prior Publication Data
US 2023/0087911 A1    Mar. 23, 2023

(30) Foreign Application Priority Data
May 27, 2020   (CN) .......................... 202010464219.2

(51) Int. Cl.
*G06F 16/56*    (2019.01)
*G09G 5/14*    (2006.01)
(Continued)

(52) U.S. Cl.
CPC .......... *H04N 7/0125* (2013.01); *G06F 16/56* (2019.01); *G09G 5/14* (2013.01); *G09G 5/393* (2013.01); *G09G 5/399* (2013.01); *H04N 19/10* (2014.11)

(58) Field of Classification Search
CPC ........ G06F 16/56; G06F 16/70; G06F 16/738; G06F 16/732; G06F 16/739; G06F 16/78;
(Continued)

(56) References Cited

U.S. PATENT DOCUMENTS

2005/0157172 A1*   7/2005   Hartley .......... H04N 21/440218
                                                        348/E7.003
2014/0028871 A1*   1/2014   Tsuda .................... H04N 9/643
                                                        348/223.1
(Continued)

FOREIGN PATENT DOCUMENTS

CN    102833552 A    12/2012
CN    104735297 A    6/2015
(Continued)

OTHER PUBLICATIONS

Rojas, "SDI, HD-SDI, 3G-SDI, 6G-SDI, 12G and 24G-SDI: The Definitive Guide" (retrieved from https://www.optcore.net/introduction-to-sdi/) (Year: 2017).*

*Primary Examiner* — Hau H Nguyen
(74) *Attorney, Agent, or Firm* — IPro, PLLC (57) ABSTRACT

Disclosed is a method for generating a vector diagram. The method is applicable to a field programmable gate array and includes: acquiring video data of an ultra-high definition video system; generating vector diagram data based on the video data; acquiring a pre-generated background image of a vector diagram; and generating the vector diagram based on the background image and the vector diagram data.

12 Claims, 5 Drawing Sheets

(51) Int. Cl.
*G09G 5/393* (2006.01)
*G09G 5/399* (2006.01)
*H04N 7/01* (2006.01)
*H04N 19/10* (2014.01)

(58) Field of Classification Search
CPC .... G06T 2207/10024; G09G 2340/125; G09G 5/14; G09G 5/363; G09G 5/399
See application file for complete search history.

(56) References Cited

U.S. PATENT DOCUMENTS

2015/0146013 A1\* 5/2015 Amino ................... H04N 17/02
 348/185
2018/0202940 A1\* 7/2018 Olsson ................. H04N 23/683

FOREIGN PATENT DOCUMENTS

CN 108805957 A 11/2018
WO 2005099423 A2 10/2005

\* cited by examiner

| Input | | Frame N | Frame N+1 | | |
|---|---|---|---|---|---|
| | Write port | Writing UV | Writing 0 | Writing UV | Writing 0 |
| RAM1 | | | | | |
| | Write port | × | Reading UV | × | Reading UV |

| | Write port | × | Writing UV | Writing 0 | Writing UV |
|---|---|---|---|---|---|
| RAM17 | | | | | |
| | Write port | × | × | Reading UV | × |
| Output | | | Frame N | Frame N+1 | |

METHOD AND APPARATUS FOR GENERATING VECTOR DIAGRAM AND STORAGE MEDIUM

CROSS-REFERENCE TO RELATED APPLICATION

This application is a U.S. national phase application based on PCT/CN2021/096040, filed on May 26, 2021, which is based on and claims priority to Chinese patent application No. 202010464219.2, filed on May 27, 2020 and entitled "METHOD AND APPARATUS FOR DRAWING VECTOR DIAGRAM BASED ON 8K VIDEO SYSTEM AND STORAGE MEDIUM", all of which are hereby incorporated by reference in their entireties for all purposes.

TECHNICAL FIELD

The present disclosure relates to the field of data processing technologies, and in particular relates to a method and apparatus for generating a vector diagram, and a storage medium.

BACKGROUND

For an ultra-high-definition (UHD) video system, for example, an 8k video system, it is necessary to calibrate its image color by a vector diagram.

SUMMARY

Embodiments of the present disclosure provide a method and apparatus for generating a vector diagram, and a storage medium.

An embodiment of the present disclosure provides a method for generating a vector diagram. The method is applicable to a field programmable gate array (FPGA) and includes: acquiring video data of an ultra-high-definition (UHD) video system generating vector diagram data based on the video data; acquiring a pre-generated background image of a vector diagram; and generating the vector diagram based on the background image and the vector diagram data.

Optionally, the background image is pre-stored in a system on chip (SoC), and acquiring the pre-generated background image of the vector diagram includes: receiving the background image from the SoC.

Optionally, generating the vector diagram data based on the video data includes:
counting vector diagram information of each frame image in the video data;
extracting a vector diagram timing from the video data; and
acquiring the vector diagram data by combining the vector diagram information of each frame image with the vector diagram timing.

Optionally, counting the vector diagram information of each frame image in the video data includes:
counting the vector diagram information of each frame image in the video data by regional counting.

Optionally, counting the vector diagram information of each frame image in the video data by regional counting includes:
regionally counting the vector diagram information of each frame image in the video data by using a dual-port random access memory (RAM) and a RAM ping-pong operation mechanism.

Optionally, regionally counting the vector diagram information of each frame image in the video data by using the dual-port RAM and the RAM ping-pong operation mechanism includes:
determining, according to a number of regions, a number of dual-port RAMs required, wherein the number of dual-port RAMs required is twice the number of regions;
dividing the dual-port RAMs required into two groups; and
regionally counting the vector diagram information of each frame image in the video data by using the RAM ping-pong operation mechanism and two groups of dual-port RAMs, wherein one group of dual-port RAMs in the two groups of dual-port RAMs are configured to regionally count vector diagram information of an odd-numbered frame image in the video data, and the other group of dual-port RAMs in the two groups of dual-port RAMs are configured to regionally count vector diagram information of an even-numbered frame image in the video data.

Optionally, regionally counting the vector diagram information of each frame image in the video data by using the RAM ping-pong operation mechanism and the two groups of dual-port RAMs includes the following two steps alternately:
regionally counting the vector diagram information of the odd-numbered frame image by using a first group of dual-port RAMs; and
regionally counting the vector diagram information of the even-numbered frame image by using a second group of dual-port RAMs;
wherein 0 is written into write ports of the second group of dual-port RAMs in response to write ports of the first group of dual-port RAMs regionally counting the vector diagram information of the odd-numbered frame image, and 0 is written into the write ports of the first group of dual-port RAMs in response to the write ports of the second group of dual-port RAMs regionally counting the vector diagram information of the even-numbered frame image; and
read ports of the second group of dual-port RAMs do not perform any operation in response to read ports of the first group of dual-port RAMs reading the vector diagram information of the odd-numbered frame image, and the read ports of the first group of dual-port RAMs do not perform any operation in response to the read ports of the second group of dual-port RAMs reading the vector diagram information of the even-numbered frame image.

Optionally, generating the vector diagram based on the background image and the vector diagram data includes:
acquiring video data carrying a vector diagram by fusing the video data, the background image, and the vector diagram data.

Optionally, the method further includes:
outputting the video data carrying the vector diagram.

Exemplarily, the UHD video system is a 4k-resolution video system, a 6k-resolution video system, an 8k-resolution video system, or a 12k-resolution video system.

An embodiment of the present disclosure provides an apparatus for generating a vector diagram, applicable to a field programmable gate array (FPGA). The apparatus includes: a first acquiring module, configured to acquire video data of an ultra-high-definition (UHD) video system; a first generating module, configured to generate vector diagram data based on the video data; a second acquiring module, configured to acquire a pre-generated background image of a vector diagram; and a second generating module, configured to generate the vector diagram based on the background image and the vector diagram data.

Optionally, the background image is pre-stored in a system on chip (SoC), and the second acquiring module is configured to receive the background image from the SoC.

Optionally, the first generating module includes: a counting sub-module, configured to count vector diagram information of each frame image in the video data; an extracting sub-module, configured to extract a vector diagram timing from the video data; and a combining sub-module, configured to acquire the vector diagram data by combining the vector diagram information of each frame image with the vector diagram timing.

Optionally, the counting sub-module is configured to count the vector diagram information of each frame image in the video data by regional counting.

Optionally, the counting sub-module is configured to regionally count the vector diagram information of each frame image in the video data by using a dual-port random access memory (RAM) and a RAM ping-pong operation mechanism.

Optionally, the counting sub-module is configured to; determine, according to a number of regions, a number of dual-port RAMs required, wherein the number of dual-port RAMs required is twice the number of regions; divide the dual-port RAMs required into two groups; and regionally count the vector diagram information of each frame image in the video data by using the RAM ping-pong operation mechanism and two groups of dual-port RAMs, wherein one group of dual-port RAMs in the two groups of dual-port RAMs are configured to regionally count vector diagram information of an odd-numbered frame image in the video data, and the other group of dual-port RAMs in the two groups of dual-port RAMs are configured to regionally count vector diagram information of an even-numbered frame image in the video data.

Optionally, the counting sub-module is configured to: regionally count the vector diagram information of the odd-numbered frame image by using a first group of dual-port RAMs; and regionally count the vector diagram information of the even-numbered frame image by using a second group of dual-port RAMs; wherein 0 is written into write ports of the second group of dual-port RAMs in response to write ports of the first group of dual-port RAMs regionally counting the vector diagram information of the odd-numbered frame image, and 0 is written into the write ports of the first group of dual-port RAMs in response to the write ports of the second group of dual-port RAMs regionally counting the vector diagram information of the even-numbered frame image; and read ports of the second group of dual-port RAMs do not perform any operation in response to read ports of the first group of dual-port RAMs reading the vector diagram information of the odd-numbered frame image, and the read ports of the first group of dual-port RAMs do not perform any operation in response to the read ports of the second group of dual-port RAMs reading the vector diagram information of the even-numbered frame image.

Optionally, the second generating module is configured to acquire video data carrying a vector diagram by fusing the video data, the background image, and the vector diagram data.

Optionally, the apparatus further includes: an outputting module, configured to output the video data carrying the vector diagram.

Optionally, the UHD video system is a 4k-resolution video system, a 6k-resolution video system, an 8k-resolution video system, or a 12k-resolution video system.

An embodiment of the present disclosure provides an apparatus for generating a vector diagram. The apparatus includes a field programmable gate array (FPGA), wherein the FPGA is configured to perform any one of the methods described above.

An embodiment of the present disclosure provides a non-transitory computer-readable storage medium storing a computer program, wherein the computer program, when executed by a processor, causes the processor to perform any one of the methods described above.

BRIEF DESCRIPTION OF THE DRAWINGS

To describe the technical solutions in the embodiments of the present disclosure more clearly, the following briefly introduces the accompanying drawings of the embodiments. Apparently, the accompanying drawings in the following descriptions only relate to some embodiments of the present disclosure, but are not intended to limit the present disclosure.

DETAILED DESCRIPTION

For clearer descriptions of the objectives, technical solutions, and advantages of the present disclosure, the technical solutions of the embodiments of the present disclosure are described clearly and completely with reference to the accompanying drawings in the embodiments of the present disclosure. Apparently, the described embodiments are merely a part of the embodiments of the present disclosure, rather than all of the embodiments. According to the described embodiments of the present disclosure, all of the other embodiments obtained by a person of ordinary skill in the art without any creative efforts shall fall within the protection scope of the present disclosure.

Unless otherwise defined, technical terms or scientific terms used in the present disclosure shall be taken to mean the ordinary meanings as understood by those of ordinary skill in the art to which the present disclosure belongs. The terms "first," "second," and the like used in the present disclosure do not denote any order, quantity, or importance, but are merely used to distinguish different components. Similarly, the term "a," "an," "the," or the like is not intended to limit the number, but to denote the number of at least one. The term "comprise," "include," or the like is intended to mean that the elements or objects before the term cover the elements or objects or equivalents listed after the term, without excluding other elements or objects.

Figure 1:
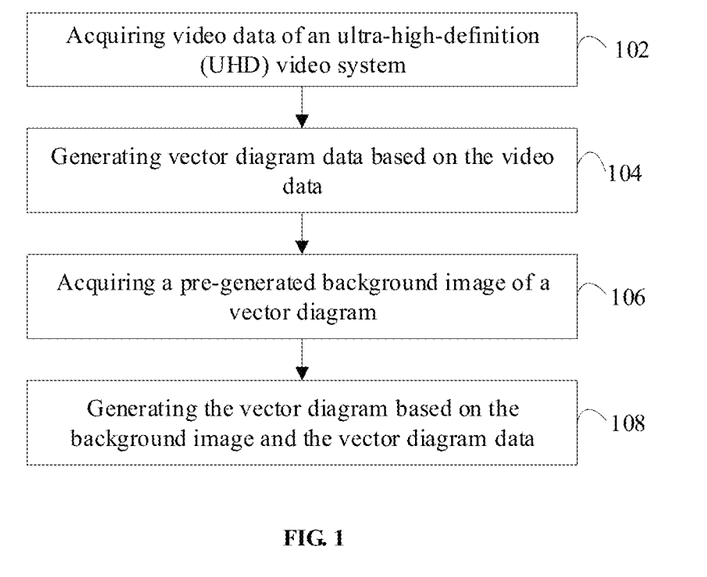
FIG. 1 is a schematic flowchart of a method for generating a vector diagram according to an embodiment of the present disclosure.

An embodiment of the present disclosure provides a method for generating a vector diagram. FIG. 1 is a schematic flowchart of a method for generating a vector diagram according to the embodiment of the present disclosure. The method may be implemented by a field programmable gate array (FPGA). As shown in FIG. 1, the method includes the following steps.

In step 102, video data of an ultra-high-definition (UHD) video system is acquired.

In step 102, the video data includes a plurality of frames of images.

In step 104, vector diagram data is generated based on the video data.

In step 104, corresponding vector diagram data is generated for each frame image of the video data.

In step 106, a pre-generated background image of a vector diagram is acquired.

Exemplarily, the background image is pre-generated before the method shown in FIG. 1 is performed. For example, the background image may be generated and stored in advance by a system on chip (SoC). Step 106 may include receiving a background image from an SoC.

In step 108, the vector diagram is generated based on the background image and the vector diagram data.

Exemplarily, the vector diagram corresponding to each frame image can be acquired by fusing the background image with the vector diagram data corresponding to each frame image.

In the present embodiment, the pre-generated background image is acquired and the vector diagram data of the video data is generated by using the FPGA, and then the vector diagram is generated based on the background image and the vector diagram data, thus providing an effective method for drawing a vector diagram of UHD video data, which can fully improve the efficiency in generating the vector diagram of the UHD video data by using the FPGA.

In some embodiments, the step 108 may include: acquiring video data carrying a vector diagram by fusing the background image, each frame image in the video data, and the corresponding vector diagram data.

In an embodiment of the present disclosure, the UHD video system includes but is not limited to a 4k video system, a 6k video system, an 8k video system, a 12k video system, and the like.

The 4k video system means that the resolution of each frame image in the corresponding video data is 4k (3,840× 2,160). The 6k video system means that the resolution of each frame image in the corresponding video data is 6k (5.760×3,240). The 8k video system means that the resolution of each frame image in the corresponding video data is 8k (7,680×4,320). The 12k video system means that the resolution of each frame image in the corresponding video data is 12k (11,520×6,480) . . . .

The present embodiment will be described in detail below by taking the 8k video system as an example. It should be noted that the method provided by the present embodiment is also applicable to UHD video systems with other resolutions.

Figure 2:
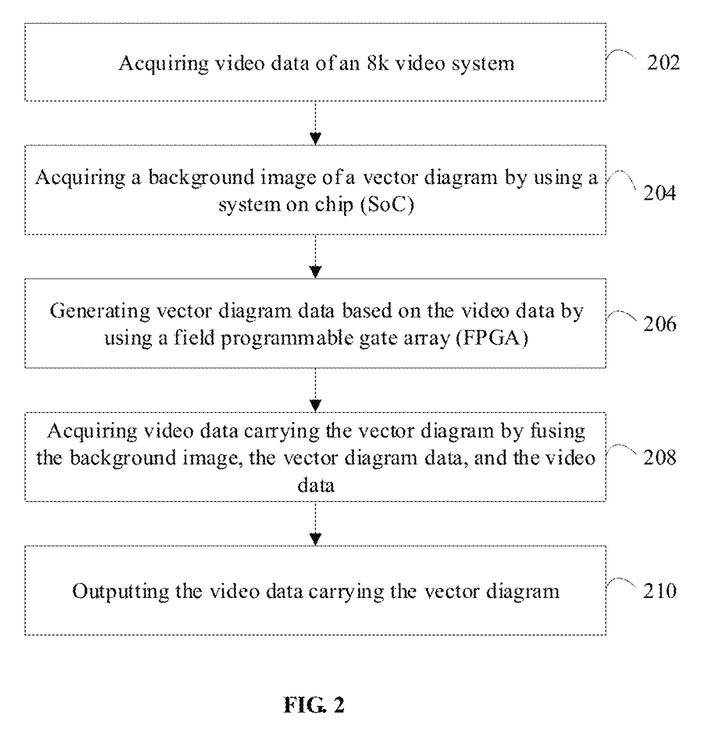
FIG. 2 is a schematic flowchart of a method for generating a vector diagram based on an 8k video system according to an embodiment of the present disclosure.

FIG. 2 is a schematic flowchart of a method for generating a vector diagram based on an 8k video system according to an embodiment of the present disclosure. The method may be implemented by a field programmable gate array (FPGA). As shown in FIG. 2, the method includes the following steps.

In step 202, video data of an 8k video system is acquired.

Optionally, the 8k video system is applied to a professional UHD monitor system, so as to provide a UHD monitoring screen for a professional monitor.

A color image may be described by three channels of red, green, and blue, or by three channels consisting of one luminance and two chrominance. The former is an RGB color space and the latter is a YUV color space. The vector diagram is built based on the YUV color space. In a digital system, the three channels of the YUV color space are usually referred to as Y, Cr, and Cb, in which the subscript r represents that a channel U is calculated by subtracting a red RGB signal from a luminance signal Y, and the subscript b represents that a channel V is calculated by subtracting a blue RGB signal from a luminance signal Y, that is, the average R, G, and B in a broad sense.

Figure 3:
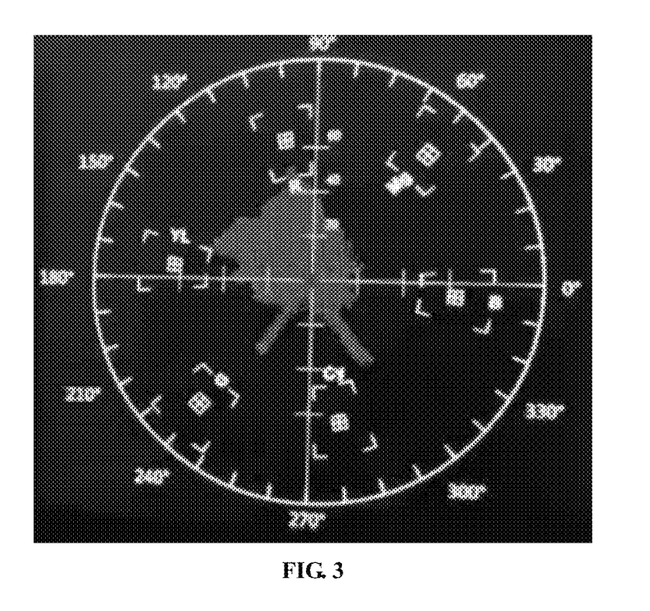
FIG. 3 is a schematic diagram of a vector diagram according to an embodiment of the present disclosure.

FIG. 3 is a schematic diagram of a vector diagram according to an embodiment of the present disclosure. Referring to FIG. 3, a gray color block in the middle is vector diagram information. The vector diagram is a horizontal and vertical coordinate diagram of a signal U and a signal V, the signal U is vertical and the V signal is horizontal, thus forming a display result of a color wheel of hue, with red at or near the top. The more saturated the color is, the greater the deviation between the signal U and the signal V is, and the closer the display may be to the edge of the disk of the vector diagram. The completely unsaturated color will be displayed as a point in the center.

In step 204, a background image of a vector diagram is acquired by using a system on chip (SoC).

In this step, the SoC is configured to acquire the background image of the vector diagram.

In an embodiment of the present disclosure, the number of the vector diagrams is counted by an operation of the FPGA. However, the FPGA is suitable for high-speed operation, but is not responsible for graph drawing, while the SoC is suitable for graph drawing. Therefore, the SoC is adopted to draw the background image in this step.

Optionally, referring to FIG. 3, the white wireframe is the drawn background image. As shown in FIG. 3, the background image mainly provides reference standards for the vector diagram. Generally, the background images of all the vector diagrams are the same.

Optionally, the information of the background image may be written into the SoC in advance by programming. After power-on initialization of the 8k video system, the background image is sent to the FPGA by the SoC, and the FPGA receives the background image and stores the received background image in a double data rate synchronous dynamic random access memory (DDR SDRAM, DDR for short) inside the FPGA. Optionally, in the process of power-on startup, the FPGA distinguishes the background image transmitted by the SoC via a handshaking signal between the SoC and the FPGA. Exemplarily, the handshaking signal carries indication information, and the indication information is configured to indicate that the subsequently transmitted image is the background image of the vector diagram.

In step 206, vector diagram data is generated based on the video data by using the FPGA.

In this step, the FPGA may count and draw the vector diagram information of the video data in real time.

Optionally, after power-on initialization, the video data is written into the DDR of the FPGA for subsequent processing.

Figure 4:
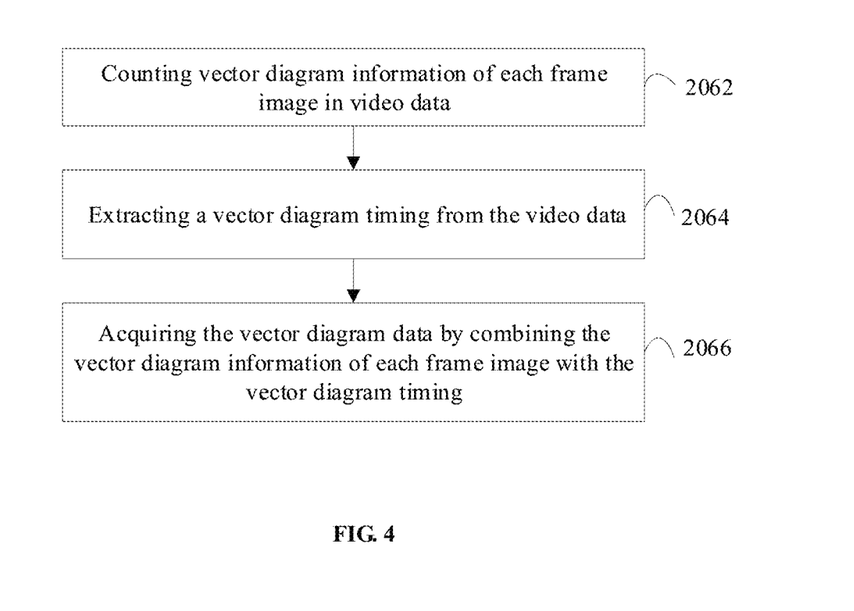
FIG. 4 is a schematic flowchart of generating vector diagram data based on video data according to an embodiment of the present disclosure.

In one or more embodiments of the present disclosure, as shown in FIG. 4, generating the vector diagram data based on the video data by using the FPGA includes the following steps.

In step 2062, vector diagram information of each frame image in the video data is counted.

In this step, the video data is a video stream and contains single frames of images arranged in sequence. For each frame image in the video data, the vector diagram information is counted.

Optionally, before counting the vector diagram information, it is necessary to convert image data represented by the three channels RGB in the RGB color space into image data represented by the three channels Y, Cr, and Cb in the YUV color space.

In step 2064, a vector diagram timing is extracted from the video data.

In this step, the vector diagram timing may be generated based on a video stream timing. Optionally, the vector diagram timing may be generated by a timing generation module (VTG) inside the FPGA.

Exemplarily, the vector diagram is superimposed on a corresponding frame image, for example, the vector diagram is disposed at the lower right corner, at the upper left corner, or in other local positions of the frame image. Therefore, the vector diagram timing may be generated by the video stream timing.

In step 2066, the vector diagram data is acquired by combining the vector diagram information of each frame image with the vector diagram timing.

In this step, the vector diagram information and the vector diagram timing may be combined into the vector diagram data based on the vector diagram information of each frame image and the vector diagram timing generated based on the video stream.

Optionally, the vector diagram data may be written into the DDR of the FPGA for subsequent processing.

In one or more embodiments of the present disclosure, counting the vector diagram information of each frame image in the video data includes:

counting the vector diagram information of each frame image in the video data by regional counting.

Figure 5:
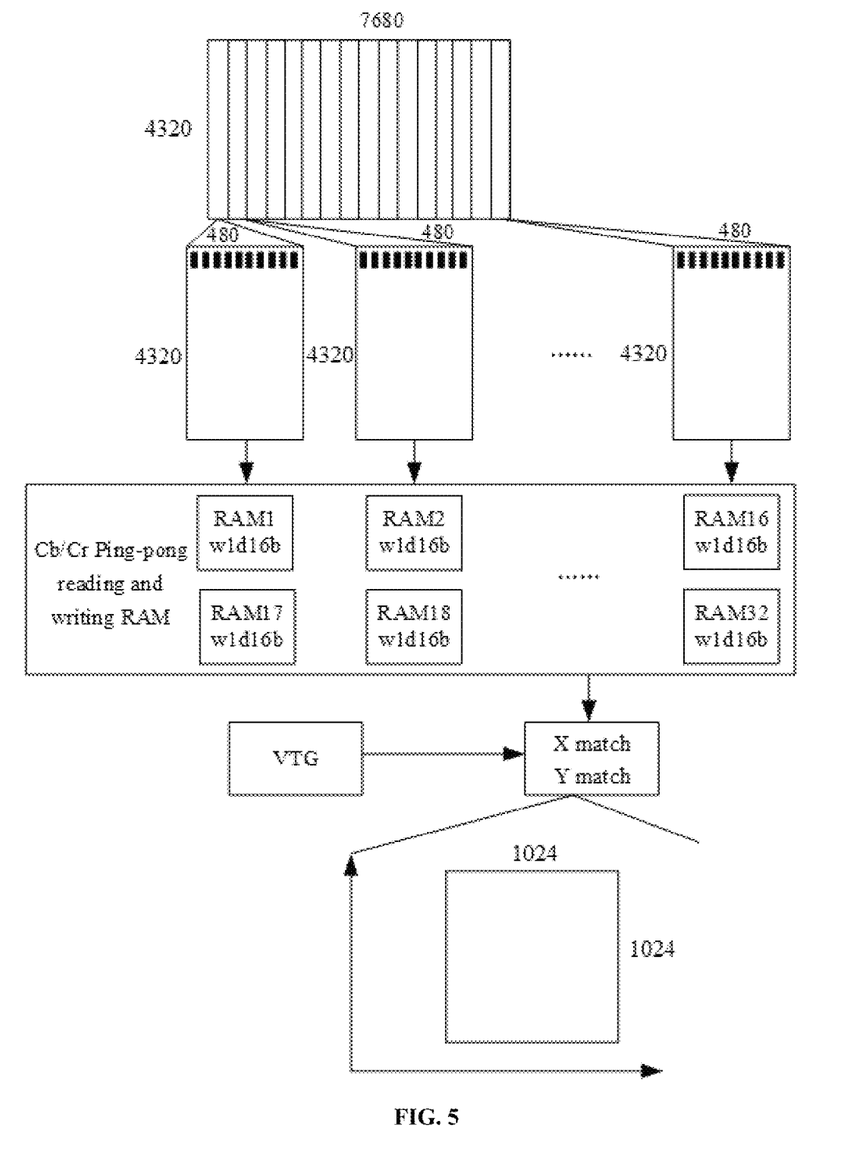
FIG. 5 is a schematic diagram of counting of vector diagram information according to an embodiment of the present disclosure.

Referring to FIG. 5, by regionally processing an original image with the resolution of 7,680×4,320 (for example, dividing into 16 regional images of 480×4,320) and then regionally counting the vector diagram information, on the one hand, the parallel processing capability of the FPGA is utilized, on the other hand, the processing speed can be greatly improved.

In one or more embodiments of the present disclosure, counting the vector diagram information of each frame image in the video data by regional counting includes:

regionally counting the vector diagram information of each frame image in the video data by using a dual-port random access memory (RAM) and a RAM ping-pong operation mechanism.

The dual-port RAM is a shared multi-port memory which has two sets of completely independent data lines, address lines, and read-write control lines on one SRAM and allows two independent systems to access the memory randomly at the same time. The dual-port RAM has the biggest feature of storage data sharing. One memory is equipped with two sets of independent address lines, data lines, and control lines, allowing two independent central processing units (CPUs) or controllers to access a memory unit asynchronously. Due to data sharing, it needs to have access arbitration control. The internal arbitration logic control provides the following functions: timing control of access to the same address unit; allocation of access permission to data blocks of the memory unit; and signaling logic (for example, interrupt signal), and the like. The dual-port RAM may be configured to improve the throughput of a RAM and is suitable for real-time data caching.

In this step, the reading and writing efficiency can be improved by using the RAM ping-pong operation mechanism, that is, reading data in RAM 2 in response to writing in RAM 1, and reading data in RAM 1 in response to writing in RAM 2.

In one or more embodiments of the present disclosure, regionally counting the vector diagram information of each frame image in the video data by using the dual-port RAM and the RAM ping-pong operation mechanism includes:

determining, according to the number of regions, the number of dual-port RAMs required, wherein the number of dual-port RAMs required is twice the number of regions;

dividing the dual-port RAMs required into two groups;

regionally counting the vector diagram information of each frame image in the video data by using the RAM ping-pong operation mechanism and two groups of dual-port RAMs, wherein one group of dual-port RAMs in the two groups of dual-port RAMs are configured to regionally count vector diagram information of an odd-numbered frame image in the video data, and the other group of dual-port RAMs in the two groups of dual-port RAMs are configured to regionally count vector diagram information of an even-numbered frame image in the video data.

In the embodiment that adopts the regional counting method, for each regional image, the vector diagram information may be counted by using one dual-port RAM. Therefore, for one frame image, a corresponding number of RAMs are required for processing according to the number of regions. In the embodiment that adopts the RAM ping-pong operation mechanism, since an odd-numbered frame image and an even-numbered frame image need different RAMs for counting, two groups of RAMs need to operate at the same time, that is, reading data in a second group of RAMs in response to writing a first group of RAMs and reading data in the first group of RAMs in response to writing the second group of RAMs.

Referring to FIG. 5, by taking one frame image as an example, the counting and drawing process of the vector information mainly includes the following steps.

a) Inputting data: 480*4,320*16@148.5 MHz, in which 16 is the number of regions, 480*4,320 is the resolution of each region, and 148.5 MHz is the clock frequency. Exemplarily, the clock frequency corresponds to a code stream of the video data, for example, for the video data with a code stream of 2.97 Gb/s, the clock frequency is 148.5 MHz.

b) Counting data: 480*4,320*16@148.5 MHz, all 8K pixels being traversed.

c) Regionally counting vector diagram information:

the RAM in the RAM ping-pong operation mechanism has a width of 1 and a depth of 16 bits, and a total number of 16*2=32 RAMs are required for the ping-pong operation;

wherein the width of the RAM is configured to store data Cb/Cr, is set to 1 in response to having a value, and is set to 0 in response to having no value, and the depth of the RAM is 16 bits, of which 8 bits represent 256 positions of the vertical ordinate Cr in the vector diagram and 8 bits represent 256 positions of the horizontal coordinate Cb in the vector diagram.

Writing operation: RAMs 1-16 use the high 8 bits of the pixel Cb/Cr value (the pixel Cb/Cr value is 10 bits, but a RAM address may only store 8 bits, thus the high 8 bits of the pixel Cb/Cr values are selected) as the addresses of RAM, and the addressing is set to 1.

Reading operation: RAMs 17-32 use the high 8 bits of the pixel Cb/Cr value as the addresses of RAM, and delays one beat to complete the reading operation.

d) Matched drawing of items X and Y: the actual size of an image is 1,024*1,024, and the read data of RAMs 17-32 is used as dotted data. The item X represents the horizontal coordinates and the item Y represents the vertical coordinates. The dotted data is data that needs to be identified in the background image. The size of the image is set according to actual needs, which is not limited in the present disclosure.

In one or more embodiments of the present disclosure, regionally counting the vector diagram information of each frame image in the video data by using the RAM ping-pong operation mechanism and the two groups of dual-port RAMs includes the following two steps alternately:

regionally counting the vector diagram information of the odd-numbered frame image by using a first group of dual-port RAMs; and regionally counting the vector diagram information of the even-numbered frame image by using a second group of dual-port RAMs;

wherein 0 is written into write ports of the second group of dual-port RAMs in response to write ports of the first group of dual-port RAMs regionally counting the vector diagram information of the odd-numbered frame image, and 0 is written into the write ports of the first group of dual-port RAMs in response to the write ports of the second group of dual-port RAMs regionally counting the vector diagram information of the even-numbered frame image; and read ports of the second group of dual-port RAMs do not perform any operation in response to read ports of the first group of dual-port RAMs reading the vector diagram information of the odd-numbered frame image, and the read ports of the first group of dual-port RAMs do not perform any operation in response to the read ports of the second group of dual-port RAMs reading the vector diagram information of the even-numbered frame image.

Figure 6:
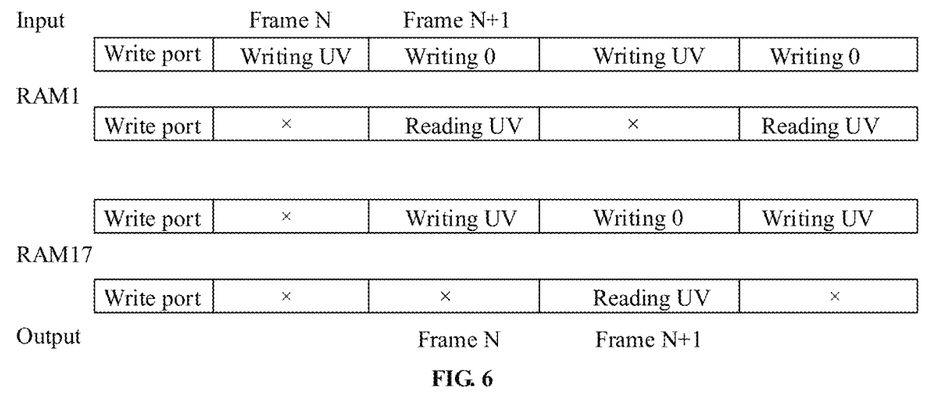
FIG. 6 is a schematic diagram of a random access memory (RAM) ping-pong operation mechanism according to an embodiment of the present disclosure.

FIG. 6 shows one embodiment of the RAM ping-pong operation mechanism.

By taking an input image divided into 16 regions as an example (referring to FIG. 5), a total number of 32 dual-port RAMs are required, and Frame N (for example, an odd-numbered frame) operates the first group of RAMs (RAMs 1-16); Frame N+1 (for example, an even-numbered frame) operates the second group of RAMs (RAMs 17-32). The specific operation of the RAM ping-pong operation mechanism is described below.

In response to inputting data of Frame N, the write port of RAM 1 forms a 16-bit address by the high 8 bits of a UV address, and writes first data of Frame N by using the 16-bit address as a writing address of RAM 1, with the organization form [U[9:2], V[9:2]], and the read port of RAM 1 does not perform any operation.

In response to inputting data of Frame N, the write port of RAM 17 does not perform any operation, and the read port of RAM 17 does not perform any operation, either.

In response to inputting data of Frame N+1, the write port of RAM 1 writes 0 according to the timing of 1,024*1,024, and the read port of RAM 1 reads data according to the timing of 1,024*1,024.

In response to inputting data of Frame N+1, the write port of RAM 17 forms a 16-bit address by the high 8 bits of the UV address and writes first data of Frame N+1 by using the 16-bit address as the writing address of RAM 1, with the organization form [U[9:2],V[9:2]], and the read port of RAM 17 does not perform any operation.

9:2 represents the high 8 bits of 10 bits, that is, the $9^{th}$ bit to the $2^{nd}$ bit.

The operation modes of RAMs 2-16 are the same as that of RAM 1. The operation modes of RAMs 18-32 are the same as that of RAM 17.

In the above-mentioned embodiments, by real-time calculation of counting data using ping-pong operation of the dual-port RAM, two implementations of 100% and 75% of the vector diagram can be realized, 100% and 75% are two indicators of the vector diagram, referring to the length of a statistical result relative to the center point. At 75%, all the largest colors of red, yellow, green, cyan, blue, and pinkish red fall on the matts in FIG. 3, for calibrating whether the colors are correct or not, 100% is the actual length of the above colors, not exceeding the circle in FIG. 3. Therefore, 75% is more valuable for reference, but ordinary monitors have both of the two options.

In step 208, video data carrying a vector diagram is acquired by fusing the background image, the vector diagram data, and the video data.

Optionally, the background image is written into the DDR of the FPGA for storage, the vector diagram data is also stored in the DDR of the FPGA after counting and drawing are completed, and the video data is also written into the DDR of the FPGA after the power-on initialization. When it is necessary to fuse the three, they are read from the DDR and superimposed, so as to accomplish a complete fusion of the vector diagram data, the background image, and the video data on an output side of the DDR.

Exemplarily, for any frame image in the video data, the background image, the vector diagram data, and the video data are superimposed in the following way.

In the case that the vector diagram data corresponding to a pixel in a region of the vector diagram is equal to 0, the vector diagram data of this pixel is set to be transparent (that is, replaced with the video data of the corresponding pixel), or translucent (that is, the luminance value of the video data of the corresponding pixel is halved, and Cr and Cb values are unchanged), or opaque (that is, the vector diagram data of this pixel is set to be black).

In the case that the vector diagram data corresponding to the pixel in a region of the vector diagram is greater than 0, the vector diagram data is used as the Y value of the corresponding pixel, and a gray signal or a green signal is used as the Cr and Cb values of the corresponding pixel.

In this process, the same remote direct memory access (RDMA) timing may be generated based on the video data to fuse the video data, the background image, and the vector diagram data. RDMA transfers information directly into a storage area of a computer through the network, and quickly moves data from one system to a memory of a remote system without adversely affecting an operating system, which does not require much processing function of the computer. The overheads of external memory copying and context switching are eliminated, and thus the memory bandwidth and CPU cycles are freed for improving the performance of an application system.

In step 210, the video data carrying the vector diagram is output.

The video data carrying the vector diagram is output in this step, in which the vector diagram may be configured to measure color deviation of a video image. Usually, the color is calibrated by professionals with the vector diagram to ensure that color matching meets the technical standards.

Optionally, sending to a display may be realized by V-by-One for outputting the video data carrying the vector diagram. V-by-One is a digital interface standard specially developed for image transmission. A low voltage differential signal (LVDS) is used as the input and output level of a signal, and the signal frequency of a board card is about 1 GHz. Compared with a complementary metal oxide semiconductor/transistor-transistor logic (CMOS/TTL) mode, this method can reduce the number of transmission lines to about 1/10 of the previous.

It can be seen from the above embodiments that the method for generating the vector diagram based on the 8k video system according to the present disclosure draws the background image by using the SoC, then generates the vector diagram data of the video data by using the FPGA, after that, fuses the background image, the vector data, and the video data into the video data carrying the vector diagram and outputs the video data carrying the vector diagram, thus providing an effective method for drawing a vector diagram of 8k video data. The output video data carrying the vector diagram can be used by relevant personnel for analysis on the video image and other operations.

Figure 7:
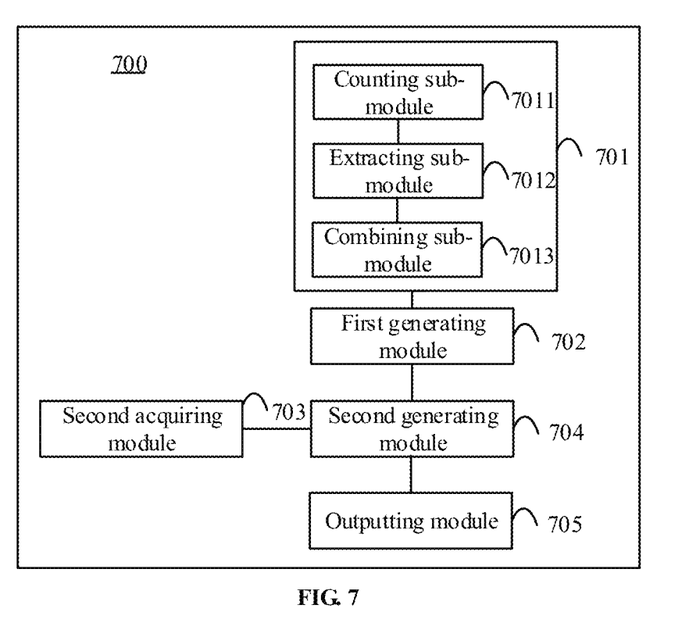
FIG. 7 is a schematic structural diagram of an apparatus for generating a vector diagram according to an embodiment of the present disclosure.

FIG. 7 is a schematic structural diagram of an apparatus 700 for generating a vector diagram according to an embodiment of the present disclosure. The apparatus is applied to a field programmable gate array (FPGA) and includes: a first acquiring module 701, a first generating module 702, a second acquiring module 703, and a second generating module 704. The first acquiring module 701 is configured to acquire video data of an ultra-high-definition (UHD) video system. The first generating module 702 is configured to generate vector diagram data based on the video data. The second acquiring module 703 is configured to acquire a pre-generated background image of a vector diagram. The second generating module 704 configured to generate the vector diagram based on the background image and the vector diagram data.

Optionally, the background image is pre-stored in a system on chip (SoC), and the second acquiring module 703 is configured to receive the background image from the SoC.

Optionally, the first generating module 701 includes: a counting sub-module 7011, configured to count vector diagram information of each frame image in the video data; an extracting sub-module 7012, configured to extract a vector diagram timing from the video data; and a combining sub-module 7013, configured to acquire the vector diagram data by combining the vector diagram information of each frame image with the vector diagram timing.

Optionally, the counting sub-module 7011 is configured to count the vector diagram information of each frame image in the video data by regional counting.

Optionally, the counting sub-module 7011 is configured to regionally count the vector diagram information of each frame image in the video data by using a dual-port random access memory (RAM) and a RAM ping-pong operation mechanism.

Optionally, the counting sub-module 7011 is configured to: determine, according to a number of regions, a number of dual-port RAMs required, wherein the number of dual-port RAMs required is twice the number of regions; divide the dual-port RAMs required into two groups; and regionally count the vector diagram information of each frame image in the video data by using the RAM ping-pong operation mechanism and two groups of dual-port RAMs, wherein one group of dual-port RAMs in the two groups of dual-port RAMs are configured to regionally count vector diagram information of an odd-numbered frame image in the video data, and the other group of dual-port RAMs in the two groups of dual-port RAMs are configured to regionally count vector diagram information of an even-numbered frame image in the video data.

Optionally, the counting sub-module 7011 is configured to: regionally count the vector diagram information of the odd-numbered frame image by using a first group of dual-port RAMs; and regionally count the vector diagram information of the even-numbered frame image by using a second group of dual-port RAMs; wherein 0 is written into write ports of the second group of dual-port RAMs in response to write ports of the first group of dual-port RAMs regionally counting the vector diagram information of the odd-numbered frame image, and 0 is written into the write ports of the first group of dual-port RAMs in response to the write ports of the second group of dual-port RAMs regionally counting the vector diagram information of the even-numbered frame image; and read ports of the second group of dual-port RAMs do not perform any operation in response to read ports of the first group of dual-port RAMs reading the vector diagram information of the odd-numbered frame image, and the read ports of the first group of dual-port RAMs do not perform any operation in response to the read ports of the second group of dual-port RAMs reading the vector diagram information of the even-numbered frame image.

Optionally, the second generating module 704 is configured to acquire video data carrying a vector diagram by fusing the video data, the background image, and the vector diagram data.

Optionally, the apparatus further includes: an outputting module 705, configured to output the video data carrying the vector diagram.

Optionally, the UHD video system is a 4k-resolution video system, a 6k-resolution video system, an 8k-resolution video system, or a 12k-resolution video system.

Figure 8:
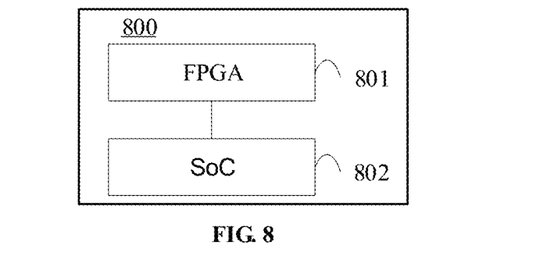
FIG. 8 is a schematic structural diagram of an apparatus for generating a vector diagram according to an embodiment of the present disclosure.

FIG. 8 is a schematic structural diagram of an apparatus 800 for generating a vector diagram according to an embodiment of the present disclosure. As shown in FIG. 8, the apparatus includes an FPGA 801 configured to perform the method as shown in FIG. 1 or 3.

Optionally, the apparatus further includes an SoC 802 with a background image pre-stored therein, and the SoC is configured to send the background image to the FPGA 801.

Figure 9:
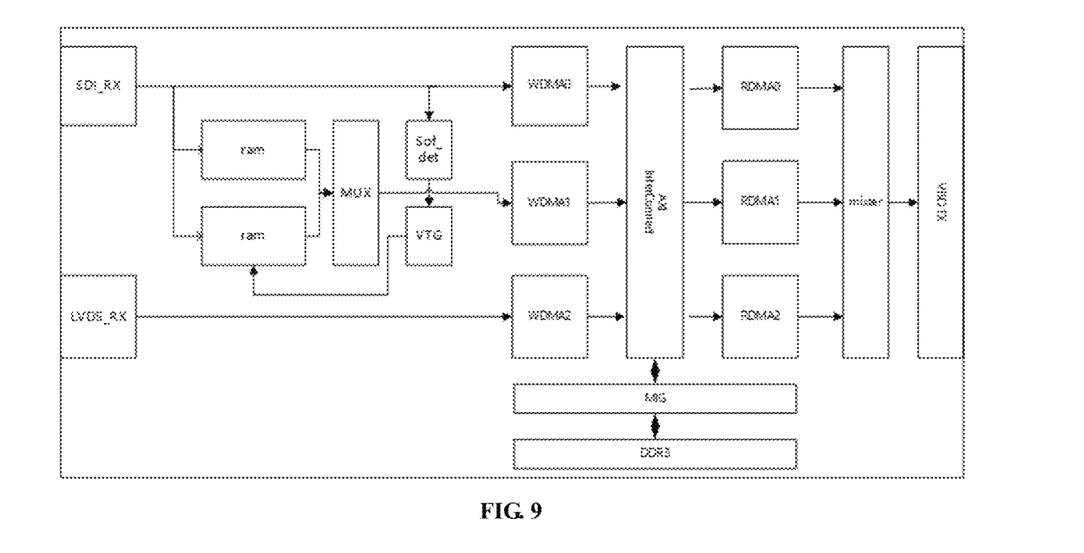
FIG. 9 is a schematic diagram of an internal module structure of a field programmable gate array (FPGA) according to an embodiment of the present disclosure.

FIG. 9 is an embodiment of an internal module structure of an FPGA. As shown in FIG. 9, the FPGA 801 includes:
 a serial digital interface (SDI) receiving module SDI_RX configured to receive video data;
 a low-voltage differential signaling (LVDS) receiving module LVDS_RX configured to receive a background image;

a RAM configured to store UV information of the video data;

an MUX module used as a data selection path;

a timing generating module VTG configured to generate a vector diagram timing, exemplarily, the vector diagram timing being a 1,920*1,080 timing in the present embodiment;

an image fusing module Mixter configured to fuse the background image, vector diagram data, and the video data into video data carrying a vector diagram;

an outputting module VBO Tx configured to output the video data carrying the vector diagram;

a plurality of writing DDR controllers, including: a WDMA0 configured to control writing of the video data, a WDMA1 configured to control writing of the vector diagram data, and a WDMA2 configured to control writing of the background image;

a plurality of reading DDR controllers, including: an RDMA0 configured to control reading of the video data, an RDMA1 configured to control reading of the vector diagram data, and an RDMA2 configured to control reading of the background image; and an advanced extensible interface (AXI) interconnect module configured to connect the plurality of writing DDR controllers to the plurality of reading DDR controllers.

Optionally, as shown in FIG. 9, the apparatus further includes a DDR3 and a memory interface generator (MIG); the DDR3 is connected to the FPGA by the MIG, and is configured to store the video data, the vector diagram data, and the background image; and the MIG is configured to read and write the DDR3.

For the convenience of description, the above apparatus is divided into various modules by function for description. In addition, the functions of the various modules may be implemented in one or more software and/or hardware during implementation of one or more embodiments of the description.

The apparatuses described in the foregoing embodiments are configured to implement the corresponding methods described in the aforementioned embodiments and have the beneficial effects of the corresponding method embodiments, which are not repeated herein.

An embodiment of the present disclosure provides a computer-readable storage medium storing a computer-executable instruction, and the computer-executable instruction can perform the method in any of the foregoing method embodiments. The technical effects of the embodiment of the computer-readable storage medium are the same as or similar to those of any of the foregoing method embodiments.

It should be noted that those of ordinary skill in the art can understand that all or part of the flows of the above method embodiments may be completed by a computer program to instruct related hardware, and the program may be stored in a computer-readable storage medium, which, when executed, may include the flows of the method embodiments as described above. The related hardware may include but is not limited to a CPU, a controller, and the like. The technical effects of the computer program embodiment are the same as or similar to any of the foregoing method embodiments.

In addition, typically, the apparatuses, devices, and the like described in the present disclosure may be various electronic terminal devices, such as a mobile phone, a personal digital assistant (PDA), a tablet computer (PAD), and a smart TV, and may also be large terminal devices, such as a server, thus the protection scope of the present disclosure should not be limited to a certain type of apparatus or device.

The computer-readable storage medium (for example, a memory) described herein may be a volatile memory or a non-volatile memory, or may include both the volatile memory and non-volatile memory. By way of exemplary but not limiting illustration, the non-volatile memory may be a read-only memory (ROM), a programmable ROM (PROM), an electrically programmable ROM (EPROM), an electrically erasable programmable ROM (EEPROM), or a flash memory. The volatile memory may be a random access memory (RAM), which is used as an external cache. By way of exemplary but not limiting illustration, many forms of RAMs, such as a synchronous RAM (SRAM), a dynamic RAM (DRAM), a synchronous DRAM (SDRAM), a double data rate SDRAM (DDR SDRAM), an enhanced SDRAM (ESDRAM), a synchronization link DRAM (SLDRAM), and a direct Rambus RAM (DRRAM), are available.

Those skilled in the art will also appreciate that the steps of the various exemplary logical blocks, modules, circuits, methods, and algorithms described in connection with the present disclosure herein may be implemented in the form of electronic hardware, computer software, or a combination thereof. For clarity of the interchangeability of the hardware and the software, various illustrative components, blocks, modules, circuits, and steps have been described generally in terms of their functions. Whether these functions are executed in the form of the hardware or software depends on the specific application and design constraints imposed on the overall system. Those skilled in the art can use different methods for implementing the described functions for each particular application, but such implementation should not be considered to be beyond the scope of the present invention.

The various exemplary logical blocks, modules, and circuits described in connection with the present disclosure herein may be implemented or executed by using the following components designed to perform the functions described herein: a general-purpose processor, a digital signal processor (DSP), an application specific integrated circuit (ASIC), a field programmable gate array (FPGA) or other programmable logic devices, discrete gate, or transistor logic, discrete hardware components, or any combination thereof. The general-purpose processor may be a microprocessor, but alternatively, the processor may be any conventional processor, controller, microcontroller, or state machine. The processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in a RAM, a flash memory, a ROM, an EPROM, an EEPROM, a register, a hard disk, a removable disk, a CD-ROM, or any other form of storage medium known in the art. An exemplary storage medium is coupled to the processor such that the processor can read information from, and write information to, the storage medium. In an alternative solution, the storage medium may be integrated with the processor. The processor and the storage medium may reside in an ASIC. The ASIC may reside in a user terminal. In an alternative solution, the processor and the storage medium may reside as discrete components in a user terminal.

In one or more exemplary designs, the functions described may be implemented in hardware, software, firmware, or any combination thereof. In the case that implemented in software, these functions may be stored on a computer-readable medium or transmitted by the computer-readable medium as one or more instructions or codes. The computer-readable medium includes a computer storage medium and a communication medium. The communication medium includes any medium that transfers a computer program from one place to another place. The storage medium may be any available medium accessible to a general-purpose or special-purpose computer. By way of exemplary but not limiting illustration, the computer-readable medium may include a RAM, a ROM, an EEPROM, a compact disc read-only memory (CD-ROM), or other optical disk storage devices, magnetic disk storage devices, or other magnetic storage devices, or any other medium that can be used to carry or store desired program codes in the form of instructions or data structures and are accessible to a general-purpose or special-purpose computer or a general-purpose or special-purpose processor. Moreover, any connection can be properly termed a computer-readable medium. For example, in the case that the software is transmitted from a website, server, or other remote sources using a coaxial cable, a fiber optic cable, a twisted pair, a digital subscriber line (DSL), or wireless technologies such as infrared, radio, and microwave, then the coaxial cable, the fiber optic cable, the twisted pair, the DSL, or the wireless technologies such as infrared, radio, and microwave are included in the definition of medium. The magnetic disks and optical disks, as used herein, include a compact disc (CD), a laser disc, an optical disc, a digital versatile disc (DVD), a floppy disk, and a Blu-ray disc where the magnetic disks usually reproduce data magnetically, while the optical disks reproduce data optically with lasers. Combinations of the above should also be included within the scope of computer-readable media.

A person of ordinary skill in the art should understand that the discussion of any of the above embodiments is merely for an exemplary purpose, and is not intended to imply that the scope of the present disclosure (including the claims) is limited to these examples. Under the concept of the embodiments of the present disclosure, the above embodiments or the technical features in different embodiments may also be combined. Moreover, many other variations in different aspects of the embodiments of the present disclosure as described above are possible but not provided in the detail for the sake of brevity. Therefore, any omission, modification, equivalent substitution, improvement, and the like made within the spirit and principle of the embodiments of the present disclosure shall be construed as being included in the protection scope of the present disclosure.

What is claimed is:

1. A method for generating a vector diagram, applicable to a field programmable gate array (FPGA), comprising:
    acquiring video data of an ultra-high-definition (UHD) video system;
    regionally counting vector diagram information of each frame image in the video data by using a dual-port random access memory (RAM) and a RAM ping-pong operation mechanism;
    extracting a vector diagram timing from the video data;
    acquiring vector diagram data by combining the vector diagram information of each frame image with the vector diagram timing;
    acquiring a pre-generated background image of a vector diagram; and
    generating the vector diagram based on the background image and the vector diagram data;
    wherein said regionally counting the vector diagram information of each frame image in the video data by using the dual-port RAM and the RAM ping-pong operation mechanism comprises:
    determining, according to a number of regions, a number of dual-port RAMs required, wherein the number of dual-port RAMs required is twice the number of regions;
    dividing the dual-port RAMs required into two groups; and
    regionally counting the vector diagram information of each frame image in the video data by using the RAM ping-pong operation mechanism and two groups of dual-port RAMs, wherein one group of dual-port RAMs in the two groups of dual-port RAMs are configured to regionally count vector diagram information of an odd-numbered frame image in the video data, and the other group of dual-port RAMs in the two groups of dual-port RAMs are configured to regionally count vector diagram information of an even-numbered frame image in the video data.

2. The method according to claim 1, wherein the background image is pre-stored in a system on chip (SoC), and said acquiring the pre-generated background image of the vector diagram comprises:
    receiving the background image from the SoC.

3. The method according to claim 1, wherein said regionally counting the vector diagram information of each frame image in the video data by using the RAM ping-pong operation mechanism and the two groups of dual-port RAMs comprises the following two steps alternately:
    regionally counting the vector diagram information of the odd-numbered frame image by using a first group of dual-port RAMs; and
    regionally counting the vector diagram information of the even-numbered frame image by using a second group of dual-port RAMs;
    wherein 0 is written into write ports of the second group of dual-port RAMs in response to write ports of the first group of dual-port RAMs regionally counting the vector diagram information of the odd-numbered frame image, and 0 is written into the write ports of the first group of dual-port RAMs in response to the write ports of the second group of dual-port RAMs regionally counting the vector diagram information of the even-numbered frame image; and
    read ports of the second group of dual-port RAMs do not perform any operation in response to read ports of the first group of dual-port RAMs reading the vector diagram information of the odd-numbered frame image, and the read ports of the first group of dual-port RAMs do not perform any operation in response to the read ports of the second group of dual-port RAMs reading the vector diagram information of the even-numbered frame image.

4. The method according to claim 1, wherein said generating the vector diagram based on the background image and the vector diagram data comprises:

acquiring video data carrying a vector diagram by fusing the video data, the background image, and the vector diagram data.

5. The method according to claim 4, further comprising: outputting the video data carrying the vector diagram.

6. The method according to claim 1, wherein the UHD video system is a 4k-resolution video system, a 6k-resolution video system, an 8k-resolution video system, or a 12k-resolution video system.

7. An apparatus for generating a vector diagram, comprising a field programmable gate array (FPGA), wherein the FPGA is configured to perform the method as defined in claim 1.

8. A non-transitory computer-readable storage medium storing a computer program, wherein the computer program, when executed by a processor, causes the processor to perform the method as defined in claim 1.

9. An apparatus for generating a vector diagram, applicable to a field programmable gate array (FPGA), comprising:
a processor; and
a memory configured to store one or more instructions executable by the processor;
wherein the processor, when loading and executing the one or more instructions, is caused to perform:
acquiring video data of an ultra-high-definition (UHD) video system;
regionally counting vector diagram information of each frame image in the video data by using a dual-port random access memory (RAM) and a RAM ping-pong operation mechanism;
extracting a vector diagram timing from the video data;
acquiring vector diagram data by combining the vector diagram information of each frame image with the vector diagram timing;
acquiring a pre-generated background image of a vector diagram; and
generating the vector diagram based on the background image and the vector diagram data;
wherein said regionally counting the vector diagram information of each frame image in the video data by using the dual-port RAM and the RAM ping-pong operation mechanism comprises:
determining, according to a number of regions, a number of dual-port RAMs required, wherein the number of dual-port RAMs required is twice the number of regions;
dividing the dual-port RAMs required into two groups; and
regionally counting the vector diagram information of each frame image in the video data by using the RAM ping-pong operation mechanism and two groups of dual-port RAMs, wherein one group of dual-port RAMs in the two groups of dual-port RAMs are configured to regionally count vector diagram information of an odd-numbered frame image in the video data, and the other group of dual-port RAMs in the two groups of dual-port RAMs are configured to regionally count vector diagram information of an even-numbered frame image in the video data.

10. The apparatus according to claim 9, wherein the background image is pre-stored in a system on chip (SoC), and the processor, when loading and executing the one or more instructions, is caused to perform:
receiving the background image from the SoC.

11. The apparatus according to claim 9, wherein the processor, when loading and executing the one or more instructions, is caused to perform:
regionally counting the vector diagram information of the odd-numbered frame image by using a first group of dual-port RAMs; and
regionally counting the vector diagram information of the even-numbered frame image by using a second group of dual-port RAMs;
wherein 0 is written into write ports of the second group of dual-port RAMs in response to write ports of the first group of dual-port RAMs regionally counting the vector diagram information of the odd-numbered frame image, and 0 is written into the write ports of the first group of dual-port RAMs in response to the write ports of the second group of dual-port RAMs regionally counting the vector diagram information of the even-numbered frame image; and
read ports of the second group of dual-port RAMs do not perform any operation in response to read ports of the first group of dual-port RAMs reading the vector diagram information of the odd-numbered frame image, and the read ports of the first group of dual-port RAMs do not perform any operation in response to the read ports of the second group of dual-port RAMs reading the vector diagram information of the even-numbered frame image.

12. The apparatus according to claim 9, wherein the processor, when loading and executing the one or more instructions, is caused to perform:
acquiring video data carrying a vector diagram by fusing the video data, the background image, and the vector diagram data.

* * * * *